(12) United States Patent
Speer

(10) Patent No.: US 7,153,891 B2
(45) Date of Patent: Dec. 26, 2006

(54) PHOTOINITIATOR BLENDS FOR HIGH SPEED TRIGGERING

(75) Inventor: Drew V. Speer, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 61 days.

(21) Appl. No.: 10/746,626

(22) Filed: Dec. 24, 2003

(65) Prior Publication Data

US 2005/0148680 A1 Jul. 7, 2005

(51) Int. Cl.
C08J 3/28 (2006.01)

(52) U.S. Cl. .............................. 522/8; 522/16; 522/18; 522/153

(58) Field of Classification Search ................... 522/8, 522/16, 18, 153
See application file for complete search history.

(56) References Cited

U.S. PATENT DOCUMENTS

| | | |
|---|---|---|
| 3,628,962 A | 12/1971 | Murray et al. |
| 3,663,712 A | 5/1972 | von Schmeling et al. |
| 3,759,807 A | 9/1973 | Osborn et al. |
| 3,903,064 A | 9/1975 | Isigami et al. |
| 3,954,868 A | 5/1976 | von Schmeling et al. |
| 3,979,459 A | 9/1976 | Rose |
| 4,080,275 A | 3/1978 | Photis et al. |
| 4,338,171 A | 7/1982 | Barie, Jr. et al. |
| 4,515,666 A | 5/1985 | Rekers |
| 4,604,270 A | 8/1986 | Tom |
| 4,672,079 A | 6/1987 | Li Bassi et al. |
| 5,211,875 A | 5/1993 | Speer et al. |
| 5,310,497 A | 5/1994 | Ve Speer et al. |
| 5,346,644 A | 9/1994 | Speer et al. |
| 5,350,622 A | 9/1994 | Speer et al. |
| 5,399,289 A | 3/1995 | Speer et al. |
| 5,405,880 A | 4/1995 | Kimura et al. |
| 5,641,425 A | 6/1997 | McKedy et al. |
| 5,660,761 A | 8/1997 | Katsumoto et al. |
| 5,811,027 A | 9/1998 | Speer et al. |
| 6,139,770 A | 10/2000 | Katsumoto et al. |
| 6,254,804 B1 | 7/2001 | Matthews et al. |
| 6,255,248 B1 * | 7/2001 | Bansleben et al. .......... 502/159 |
| 6,464,896 B1 | 10/2002 | Speer et al. |
| 6,517,776 B1 | 2/2003 | Rodgers et al. |
| 6,572,783 B1 * | 6/2003 | Cai et al. ............... 252/188.28 |
| 2002/0119295 A1 * | 8/2002 | Speer et al. ................. 428/195 |
| 2002/0153511 A1 | 10/2002 | Cotterman et al. |
| 2003/0062505 A1 * | 4/2003 | Ching ........................... 252/1 |
| 2004/0151934 A1 * | 8/2004 | Schwark et al. ............ 428/518 |
| 2005/0019208 A1 * | 1/2005 | Speer et al. .................. 422/22 |

FOREIGN PATENT DOCUMENTS

WO    WO 02/36437 A1    5/2002

OTHER PUBLICATIONS

Irgacure® 819, CIBA, Apr. 1998, pp. 1-7.

* cited by examiner

*Primary Examiner*—Susan Berman
(74) *Attorney, Agent, or Firm*—Mark B. Quatt

(57) ABSTRACT

An oxygen scavenger composition includes an organic oxygen scavenger, a transition metal catalyst, and a blend of at least two photoinitiators selected from 1,3,5-tris(4-benzoylphenyl)benzene, thioxanthone derivative, acyl phenylphosphineoxide derivative, and diphenyl sulfide derivative. A film includes at least one layer including an organic oxygen scavenger, a transition metal catalyst, and a blend of at least two photoinitiators selected from 1,3,5-tris(4-benzoylphenyl)benzene, thioxanthone derivative, acyl phenylphosphineoxide derivative, and diphenyl sulfide derivative. A method of triggering an oxygen scavenger composition includes providing an oxygen scavenger composition including an organic oxygen scavenger, a transition metal catalyst, and a blend of at least two of 1,3,5-tris(4-benzoylphenyl)benzene, thioxanthone derivative, acyl phenylphosphineoxide derivative, and diphenyl sulfide derivative; and subjecting the oxygen scavenger composition to a dosage of actinic radiation effective to trigger the oxygen scavenger composition.

32 Claims, No Drawings

PHOTOINITIATOR BLENDS FOR HIGH SPEED TRIGGERING

FIELD OF THE INVENTION

The invention relates to blends of photoinitiators, and films and articles made therefrom, in combination with an oxygen scavenger, and to methods for improving triggering speeds.

BACKGROUND OF THE INVENTION

It is known that many oxygen sensitive products, including food products such as meat and cheese, smoked and processed luncheon meats, as well as non-food products such as electronic components, pharmaceuticals, and medical products, deteriorate in the presence of oxygen. Both the color and the flavor of foods can be adversely affected. The oxidation of lipids within the food product can result in the development of rancidity. These products benefit from the use of oxygen scavengers in their packaging.

Some of these oxygen scavengers, typically unsaturated polymers with a transition metal catalyst, can be triggered or activated by actinic radiation. Such materials offer the advantage of an oxygen scavenger that does not prematurely scavenge oxygen until such time as the user decides to use the oxygen scavenger in a commercial packaging environment. The oxygen scavenger is thus "dormant" until it is passed through a triggering unit, typically a bank of UV lights through which an oxygen scavenger in the form of a film is passed to trigger the oxygen scavenging activity of the material. This is usually done just prior to a packaging step, in which a package having as a component the oxygen scavenger is made, with an oxygen sensitive product placed in the package prior to closure of the package to extend the shelf life of the oxygen sensitive product.

Unfortunately, triggering of the type of oxygen scavenger just described during high speed packaging applications (having a packaging line speed of greater than about 40 feet per minute) presents a challenge with conventional equipment and technology. Conventional triggering units, using current film formulations when triggered on Model 4104™ SIS units available through Cryovac, Inc., are typically limited in triggering speed to about 20 fpm or less. Conventional triggering equipment is already quite large, and to achieve higher speeds with this technology would require even larger units. The size and associated costs of purchasing or leasing such equipment, maintenance costs, and the requirement of space in the processing plant to accommodate such equipment, can be economically unattractive. Some processors or potential users of oxygen scavenging film do not have room for large equipment.

A class of oxygen scavengers which do not require actinic triggering, and thus do not require the associated triggering equipment, are iron based scavengers and some polymeric scavengers that are provided in active form. Such oxygen scavengers are active at the time of manufacture without triggering by actinic radiation. These also have several disadvantages, however. Some require the presence of moisture to initiate oxygen scavenging. This may not be technically attractive in packaging environments where it is otherwise undesirable or impractical to provide a moisture source to trigger the oxygen scavenger. Also, optics of the finished package can often be undesirably compromised by discoloration or pigmentation of the oxygen scavenger itself, either in its original state or after a period of oxygen scavenging activity. Processing of these oxygen scavengers in a uniformly dispersed way can also prove difficult in conventional extrusion operations. If such scavengers are not dispersed, as is the case with iron based sachets, scavenging activity may be too localized, and uniformity of scavenging may thus not be sufficient in the entire package environment to provide proper and adequate removal of oxygen from the head space of the package, and/or active barrier from subsequent ingress of oxygen from outside the package. Furthermore, oxygen scavenging sachets are unsuitable for vacuum packaging applications.

It is currently conventional practice to employ a non-migratory photoinitiator, such as those disclosed in U.S. Pat. No. 6,139,770, which is incorporated herein as if set forth in full. An example of a non-migratory photoinitiator is $BBP^3$ (1,3,5-tris(4-benzoylphenyl)benzene).

It has now been found that certain blends of photoinitiators can be incorporated into one or more layers of an oxygen scavenging film, or into an oxygen scavenger composition or article, to improve the speed of triggering compared with that of conventional single photoinitiators. Certain blends of photoinitiators (PI) have been found to increase the speed at which oxygen scavenging film can be triggered by as much as two times. The selection of suitable blends depends in part upon the spectrum of the UV lamp used to trigger the film. Photoinitiators can be selected that absorb longer wavelength UV and/or visible light. Such photoinitiators allow for a greater portion of the emission from a polychromatic source to be utilized. Furthermore, triggering of an oxygen scavenger can be accomplished through materials that may be partially or completely UV opaque by utilizing the visible spectrum.

It has thus been found that the addition of certain photoinitiators to a conventional formulation with BBP3 can result in film that can be triggered at higher speed. With current germicidal lamps (254 nanometer principal emission wavelength), benefit was seen with the addition of isopropylthioxanthone (ITX) to BBP3, with triggering speeds increased from 20 fpm to 40 fpm. Commercial grades of ITX are known to be a mixture of isomers, principally 2 and 4 substituted. Other thioxanthone derivatives such as 2,4-diethylthioxanthone, 2-chlorothioxanthone, and 1-chloro-4-propoxythioxanthone can also show this enhancement. The addition of 4,4'-benzoylmethyl diphenyl sulfide (BMS) photoinitiator showed some benefit with all lamp types. Other substituted diphenyl sulfides can also show this benefit. When a polychromatic UV source was used such as a medium pressure mercury arc lamp or a xenon flash lamp, benefit was seen with the addition of IRGACURE™ 819 (bis(2,4,6-trimethylbenzoyl)phenylphosphineoxide). Other acylphosphine oxide type photoinitiators such as 2,4,6-trimethylbenzoyidiphenylphosphine oxide, ethyl-2,4,6-trimethylbenzoylphenyl phosphinate, and bis(2,6-dimethoxybenzoyl)-2,4,4-trimethylpentyl phosphine oxide can show a similar effect. Beneficial levels of PI to add to the conventional formulation were found to be in the range of from 500 to 1000 ppm.

Higher triggering speeds can be useful for vertical and horizontal pouch machines, which typically operate at speeds of 40 to 80 fpm.

The present invention also allows the triggering of film formulations at e.g. about half the typical dose of irradiation. A combination of faster triggering and lower dose can also be achieved in some cases.

These improvements are with respect to the present use of $BBP^3$ in conventional oxygen scavenging film formulations, and using currently commercial triggering equipment. However, improvements can also be realized using alternative triggering sources as well.

SUMMARY OF THE INVENTION

In a first aspect of the present invention, an oxygen scavenger composition comprises a) an organic oxygen scavenger, b) a transition metal catalyst, and c) a blend of at least two photoinitiators selected from i) 1,3,5-tris(4-benzoylphenyl)benzene, ii) thioxanthone derivative, iii) acyl phenylphosphineoxide derivative, and iv) diphenyl sulfide derivative.

In a second aspect of the present invention, a film comprises at least one layer comprising a) an organic oxygen scavenger, b) a transition metal catalyst, and c) a blend of at least two photoinitiators selected from i) 1,3,5-tris(4-benzoylphenyl)benzene, ii) thioxanthone derivative, iii) acyl phosphineoxide derivative, and iv) diphenyl sulfide derivative.

In a third aspect of the present invention, a method of triggering an oxygen scavenger composition comprises providing an oxygen scavenger composition comprising a) an organic oxygen scavenger, b) a transition metal catalyst, and c) a blend of at least two of i) 1,3,5-tris(4-benzoylphenyl) benzene, ii) thioxanthone derivative, iii) acyl phenylphosphineoxide derivative, and iv) diphenyl sulfide derivative; and subjecting the oxygen scavenger composition to a dosage of actinic radiation effective to trigger the oxygen scavenger composition.

DEFINITIONS

"Derivative" and the like herein means a chemical substance related structurally to another, named parent substance and actually or theoretically derivable from the named parent substance. An example is a derivative of a named substance where the derived substance includes one or more functional groups not present in the named substance.

"Oxygen scavenger", "oxygen scavenging", and the like herein means or refers to a composition, compound, film, film layer, coating, plastisol, gasket, or the like which can consume, deplete or react with oxygen from a given environment.

"Internal layer" and the like herein means a layer of a multilayer film that is not an outer layer, i.e. both surfaces of the internal layer are joined to other layers of the film.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, and ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers.

"Ethylene homopolymer or copolymer" herein refers to ethylene homopolymer such as low density polyethylene; ethylene/alpha olefin copolymer such as those defined herein; ethylene/vinyl acetate copolymer; ethylene/alkyl acrylate copolymer; ethylene/(meth)acrylic acid copolymer; or ionomer resin.

"Film" herein means a film, laminate, sheet, web, coating, or the like, which can be used to package an oxygen sensitive product. The film can be used as a component in a rigid, semi-rigid, or flexible product, and can be adhered to a non-polymeric or non-thermoplastic substrate such as paper or metal. The film can also be used as a coupon or insert within a package.

"Polymer" and the like herein means a homopolymer, but also copolymers thereof, including bispolymers, terpolymers, etc.

"Trigger" and the like herein means that process defined in U.S. Pat. No. 5,211,875, whereby oxygen scavenging is initiated (i.e. activated) by subjecting an article such as a film to actinic radiation, having a wavelength of less than about 750 nm at an intensity of at least about 1.6 mW/cm$^2$ or ionizing radiation such as an electron beam at a dose of at least 0.2 megarads (MR), or gamma radiation, wherein after initiation the oxygen scavenging rate of the article is at least about 0.05 cc oxygen per day per gram of oxidizable organic compound for at least two days after oxygen scavenging is initiated. A method offering a short "induction period" (the time that elapses, after exposing the oxygen scavenging component to a source of actinic radiation, before the oxygen scavenging activity begins) is useful in situations where the oxygen scavenging component is desirably activated at or immediately prior to use. Triggering can thus occur during filling and sealing of a container, which is made wholly or partly from the article, and containing an oxygen sensitive material.

Thus, "trigger" refers to subjecting an article to actinic radiation as described above; "triggered" refers to an article that has been subjected to such actinic radiation; "initiation" refers to the point in time at which oxygen scavenging actually begins or is activated; and "induction time" refers to the length of time, if any, between triggering and initiation. The onset of oxygen scavenging can be measured by any convenient means such as a reduction in headspace oxygen concentration, or an increase in barrier property as in the case of an active oxygen barrier system. One useful technology is the use of certain porphyrins as an oxygen indicator in a solid article such as a film, as disclosed in U.S. patent application Ser. No. 09/875,515 filed Jun. 6, 2001, incorporated herein by reference in its entirety.

All compositional percentages used herein are presented on a "by weight" basis, unless designated otherwise.

DETAILED DESCRIPTION OF THE INVENTION

An oxygen scavenger film of the invention can include multiple layers, dependent upon the properties required of the film. For example, layers to achieve appropriate slip, modulus, oxygen or water vapor barrier, oxygen scavenging, meat adhesion, heat seal, or other chemical or physical properties can optionally be included. The film may be manufactured by a variety of processes including, extrusion, coextrusion, lamination, coating, and the like. Rigid packaging structures (e.g., bottles, trays and cups) frequently incorporate layers that are partially or essentially completely UV opaque such as PET, PEN, and polystyrene. Should it be desirable or necessary to trigger an oxygen scavenger through such layers, the selection of photoinitiator blends and triggering source can readily be tailored to fulfill that purpose. For example, thioxanthone derivatives and acylphosphine oxide derivatives have significant absorption in the UVA and visible spectrum.

An outer layer of the film, such as a layer that will function as a sealant layer of the film, can comprise one or more polymers. Polymers that may be used for the surface layer include any resin typically used to formulate packaging films with heat seal properties such as various polyolefin copolymers including ethylene/alpha olefin copolymer, ethylene/vinyl acetate copolymer, ionomer resin, ethylene/acrylic or methacrylic acid copolymer, ethylene/acrylate or methacrylate copolymer, low density polyethylene, or blends of any of these materials.

A variety of antifog agents may be incorporated into the outermost layer of the oxygen scavenging film. Additional materials that can be incorporated into an outer layer of the film include antiblock agents, slip agents, etc. Suitable slip agents and antifog agents include those disclosed in U.S. patent application Ser. No. 10/683,531 filed Oct. 10, 2003 (entitled "Oxygen Scavenging Film With High Slip Properties") and Ser. No. 10/444,624 filed May 23, 2003 (entitled "Oxygen Scavenging Film With Antifog Properties"), both incorporated herein by reference in their entirety.

Oxygen Barrier Film

High oxygen barrier films can be made from materials having an oxygen permeability, of the barrier material, less than 500 $cm^3$ $O_2/m^2 \cdot day \cdot atmosphere$ (tested at 1 mil thick and at 25° C. according to ASTM D3985), such as less than 100, more preferably less than 50 and most preferably less than 25 $cm^3$ $O_2/m^2 \cdot day \cdot atmosphere$ such as less than 10, less than 5, and less than 1 $cm^3$ $O_2/m^2 \cdot day \cdot atmosphere$. Examples of polymeric materials with low oxygen transmission rates are ethylene/vinyl alcohol copolymer (EVOH), polyvinylidene dichloride (PVDC), vinylidene chloride/methyl acrylate copolymer, polyamide, and polyester.

Alternatively, metal foil or SiOx compounds can be used to provide low oxygen transmission to the container. Metallized foils can include a sputter coating or other application of a metal layer to a polymeric substrate such as high density polyethylene (HDPE), ethylene/vinyl alcohol copolymer (EVOH), polypropylene (PP), polyethylene terephthalate (PET), polyethylene naphthalate (PEN), and polyamide (PA).

Alternatively, oxide coated webs (e.g. aluminum oxide or silicon oxide) can be used to provide low oxygen transmission to the container. Oxide coated foils can include a coating or other application of the oxide, such as alumina or silica, to a polymeric substrate such as high density polyethylene (HDPE), ethylene/vinyl alcohol copolymer (EVOH), polypropylene (PP), polyethylene terephthalate (PET), polyethylene naphthalate (PEN), and polyamide (PA).

Even a sufficiently thick layer of a polyolefin such as LLDPE, or PVC (polyvinyl chloride) can in some instances provide a sufficiently low oxygen transmission rate for the overall film for its intended function. The exact oxygen permeability optimally required for a given application can readily be determined through experimentation by one skilled in the art.

Multilayer films of the invention can be made using conventional extrusion, coextrusion, and/or lamination processes. Likewise, conventional manufacturing processes can be used to make a pouch, a bag, or other container from the film.

Hermetic sealing of a pouch, bag, or other container made from the film of the invention will typically be preferable.

The exact requirements of a container made from the film will depend on a variety of factors, including the chemical nature of the oxygen scavenger, amount of the oxygen scavenger, concentration of the oxygen scavenger in a host material or diluent, physical configuration of the oxygen scavenger, presence of hermetic sealing, vacuumization and/or modified atmosphere inside the container, initial oxygen concentration inside the container, intended end use of the oxygen scavenger, intended storage time of the container before use, level of initial dose of actinic radiation, etc.

Polymeric adhesives that can be used in embodiments of the present invention include e.g. ethylene/vinyl acetate copolymer; anhydride grafted ethylene/vinyl acetate copolymer; anhydride grafted ethylene/alpha olefin copolymer; anhydride grafted polypropylene and anhydride grafted low density polyethylene.

The Oxygen Scavenger

Oxygen scavengers suitable for commercial use in articles of the present invention, such as films, are disclosed in U.S. Pat. No. 5,350,622, and a method of initiating oxygen scavenging generally is disclosed in U.S. Pat. No. 5,211,875. Suitable equipment for initiating oxygen scavenging is disclosed in U.S. Pat. No. 6,287,481 (Luthra et al.). These patents are incorporated herein by reference in their entirety. According to U.S. Pat. No. 5,350,622, oxygen scavengers are made of an ethylenically unsaturated hydrocarbon and transition metal catalyst. The ethylenically unsaturated hydrocarbon may be either substituted or unsubstituted. As defined herein, an unsubstituted ethylenically unsaturated hydrocarbon is any compound that possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Suitable substituted or unsubstituted ethylenically unsaturated hydrocarbons are those having two or more ethylenically unsaturated groups per molecule, e.g. a polymeric compound having three or more ethylenically unsaturated groups and a molecular weight equal to or greater than 1,000 weight average molecular weight.

Examples of unsubstituted ethylenically unsaturated hydrocarbons include, but are not limited to, diene polymers such as polyisoprene, (e.g., trans-polyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene/butadiene copolymer and styrene/isoprene copolymer. Such hydrocarbons also include polymeric compounds such as polypentenamer, polyoctenamer, and other polymers prepared by cyclic olefin metathesis; diene oligomers such as squalene; and polymers or copolymers with unsaturation derived from dicyclopentadiene, nonbornadiene, 5-ethylidene-2-norbornene, 5-vinyl-2-norbornene, 4-vinylcyclohexene, 1,7-octadiene, or other monomers containing more than one carbon-carbon double bond (conjugated or non-conjugated).

Examples of substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds, and unsaturated fatty acids such as oleic, ricinoleic, dehydrated ricinoleic, and linoleic acids and derivatives thereof, e.g. esters. Specific examples also include esters or polyesters of functionalized unsaturated hydrocarbons such as hydroxy terminated polybutadiene. Such hydrocarbons also include polymers or copolymers derived from (meth)allyl (meth)acrylates. Suitable oxygen scavenging polymers can be made by trans-esterification. Such polymers are disclosed in U.S. Pat. No. 5,859,145 (Ching et al.) (Chevron Research and Technology Company) incorporated herein by reference as if set forth in full. The composition used may also comprise a mixture of two or more of the substituted or unsubstituted ethylenically unsaturated hydrocarbons described above. While a weight average molecular weight of 1,000 or more is beneficial, an ethylenically unsaturated hydrocarbon having a lower molecular weight is also usable, especially if it is blended with a film-forming polymer or blend of polymers.

An additional example of oxygen scavengers which can be used in connection with this invention are disclosed in PCT patent publication WO 99/48963 (Chevron Chemical et al.), incorporated herein by reference in its entirety. These oxygen scavengers include a polymer or oligomer having at least one cyclohexene group or functionality. These oxygen scavengers include a polymer having a polymeric backbone, cyclic olefinic pendent group, and linking group linking the olefinic pendent group to the polymeric backbone.

An oxygen scavenging composition suitable for use with the invention comprises:
(a) a polymer or lower molecular weight material containing substituted cyclohexene functionality according to the following diagram:

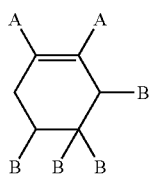

where A may be hydrogen or methyl and either one or two of the B groups is a heteroatom-containing linkage which attaches the cyclohexene ring to the said material, and wherein the remaining B groups are hydrogen or methyl;
(b) a transition metal catalyst; and
(c) a photoinitiator.

The compositions may be polymeric in nature or they may be lower molecular weight materials. In either case, they may be blended with further polymers or other additives. In the case of low molecular weight materials, they will most likely be compounded with a carrier resin before use.

Also suitable for use in the present invention is the oxygen scavenger of U.S. Pat. No. 6,255,248 (Bansleben et al.), incorporated herein by reference in its entirety, which discloses a copolymer of ethylene and a strained, cyclic alkylene, preferably cyclopentene; and a transition metal catalyst.

Another oxygen scavenger which can be used in connection with this invention is the oxygen scavenger of U.S. Pat. No. 6,214,254 (Gauthier et al.), incorporated herein by reference in its entirety, which discloses ethylene/vinyl aralkyl copolymer and a transition metal catalyst.

Transition Metal Catalysts

As indicated above, the ethylenically unsaturated hydrocarbon is combined with a transition metal catalyst. Suitable metal catalysts are those that can readily interconvert between at least two oxidation states.

The catalyst can be in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium II or III. The oxidation state of the metal when introduced is not necessarily that of the active form. Suitable counterions for the metal include, but are not limited to, chloride, acetate, stearate, palmitate, caprylate, linoleate, tallate, 2-ethylhexanoate, neodecanoate, oleate or naphthenate. Useful salts include cobalt (II) 2-ethylhexanoate, cobalt stearate, and cobalt (II) neodecanoate. The metal salt may also be an ionomer, in which case a polymeric counterion is employed. Such ionomers are well known in the art.

Any of the above-mentioned oxygen scavengers and transition metal catalyst can be further combined with one or more polymeric diluents, such as thermoplastic polymers, which are typically used to form film layers in plastic packaging articles. In the manufacture of certain packaging articles well known thermosets can also be used as the polymeric diluent.

Further additives can also be included in the composition to impart properties desired for the particular article being manufactured. Such additives include, but are not necessarily limited to, fillers, pigments, dyestuffs, antioxidants, stabilizers, processing aids, plasticizers, fire retardants, etc.

The mixing of the components listed above can be accomplished by melt blending at a temperature in the range of 50° C. to 300° C. However, alternatives such as the use of a solvent followed by evaporation may also be employed.

Oxygen scavenging structures can sometimes generate reaction byproducts, which can affect the taste and smell of the packaged material (i.e. organoleptic properties), or raise food regulatory issues. This problem can be minimized by the use of polymeric functional barriers. Polymeric functional barriers for oxygen scavenging applications are disclosed in WO 96/08371 to Ching et al. (Chevron Chemical Company), WO 94/06626 to Balloni et al., WO 97/32925 to (Blinka et al.) and copending U.S. patent application Ser. No. 09/445,645 (Miranda), all of which are incorporated herein by reference as if set forth in full, and include high glass transition temperature ($T_g$) glassy polymers such as polyethylene terephthalate (PET) and nylon 6 that are preferably further oriented; low $T_g$ polymers and their blends; a polymer derived from a propylene monomer; a polymer derived from a methyl acrylate monomer; a polymer derived from a butyl acrylate monomer; a polymer derived from a methacrylic acid monomer; polyethylene terephthalate glycol (PETG); amorphous nylon; ionomer, a polymeric blend including a polyterpene; and poly(lactic acid). The functional barriers can be incorporated into one or more layers of a multilayer film or other article that includes an oxygen scavenging layer.

Photoinitiators

These materials are disclosed in more detail herein. Blends of photoinitiators have proven beneficial as described herein. Some of the materials useful in connection with the invention include:

1,3,5-tris(4-benzoylphenyl)benzene ($BBP^3$)
isopropylthioxanthone (ITX)
bis(2,4,6-trimethylbenzoyl)phenylphosphineoxide (IRGA-CURE® 819)
2,4,6-trimethylbenzoyldiphenylphosphine oxide
ethyl-2,4,6-trimethylbenzoylphenyl phosphinate
bis(2,6-dimethoxybenzoyl)-2,4,4-trimethylpentyl phosphine oxide
4,4'-benzoylmethyl diphenyl sulfide (BMS)

The amount of photoinitiator can depend on the amount and type of unsaturation present in the polymer, the wavelength and intensity of radiation used; the nature and amount of antioxidants used; and the type of photoinitiator used.

Resin Identification

| Material Code | Tradename Or Designation | Source(s) |
|---|---|---|
| AB1 | 10853 ™ | Ampacet |
| AD1 | PLEXAR PX 107A ™ | Equistar |
| EM1 | SP2260 | Voridian |
| EV1 | PE 1375 ™ | Huntsman |
| NY1 | ULTRAMID ™ B 35 NATURAL | BASF |
| NY2 | GRIVORY ™ G21 | EMS |
| OB1 | SOARNOL ™ ET | Nippon Gohsei |
| OS1 | OSP500R ™ or DS4713R ™ | Chevron Phillips |
| OS2 | Vector 8508 | Dexco |
| OSM1 | DS4560M ™ | Chevron Phillips |
| OSM2 | DS4567M ™ | Chevron Phillips |
| OSM3 | OSP100M ™ | Chevron Phillips |
| OSM4 | 90% OS1 + 10% OSM5 | — |
| OSM5 | 90% EM1 + 10% ITX | — |
| PE1 | PE1042CS15 ™ | Huntsman |
| PE2 | AFFINITY PL 1850 ™ | Dow |
| PE3 | EXACT 4150 ™ | Exxon |
| PE4 | PE1017 ™ | Chevron/Phillips |
| PET1 | HOSTAPHAN 2DEF/2DEFN ™ | Mitsubishi |
| SX1 | MB50-313 ™ | Dow Corning |

AB1 is a masterbatch having about 80% linear low density polyethylene, and about 20% of an antiblocking agent (diatomaceous earth).

AD1 is an anhydride grafted polyolefin in ethylene/vinyl acetate copolymer (EVA), with between 9% and 11% vinyl acetate monomer, and a melt index of 3.2, used as an adhesive or tie layer.

EM1 is an ethylene/methyl acrylate copolymer.

EV1 is ethylene/vinyl acetate copolymer with 3.6% vinyl acetate monomer, and a melt index of 2.0.

NY1 is nylon 6 (polycaprolactam).

NY2 is an amorphous copolyamide (6I/6T) derived from hexamethylene diamine, isophthalic acid, and terephthalic acid.

OB1 is an ethylene/vinyl alcohol copolymer with 38 mole percent ethylene.

OS1 is an oxygen scavenger resin, poly(ethylene/methyl acrylate/cyclohexene methyl acrylate) (abbreviated as EMCM).

OS2 is an oxygen scavenger resin, a styrene butadiene block copolymer with a styrene comonomer content of about 30% by weight of the copolymer.

OSM1 is a masterbatch produced from a carrier resin (ethylene/methyl acrylate) designated SP1205 from Chevron, with 1%, by weight of the masterbatch, of cobalt present in a prill (solid) cobalt oleate, and 1%, by weight of the masterbatch, of tribenzoyl triphenyl benzene (1,3,5-tris(4-benzoylphenyl)benzene).

OSM2 is a masterbatch produced from a carrier resin (ethylene/methyl acrylate) designated SP1205 from Chevron, with 1%, by weight of the masterbatch, of cobalt present from cobalt oleate, and 1%, by weight of the masterbatch, of tribenzoyl triphenyl benzene (1,3,5-tris(4-benzoylphenyl) benzene).

OSM3 is a masterbatch produced from EM1 with 1%, by weight of the masterbatch, of cobalt present from cobalt oleate, and 1%, by weight of the masterbatch, of tribenzoyl triphenyl benzene (1,3,5-tris(4-benzoylphenyl)benzene).

OSM4 is a masterbatch produced from 90% OS1 and 10% OSM5.

OSM5 is a masterbatch produced from 90% EM1 and 10% ITX.

PE1 is a low density polyethylene resin with a density of 0.922 grams/cc.

PE2 is a single site catalyzed ethylene/1-octene copolymer with a density of 0.902 grams/cc, a melt index of 3.0, and an octene-1 comonomer content of 12%.

PE3 is a single site catalyzed ethylene/1-hexene copolymer with a density of 0.895 grams/cc, and a melt index of 3.43.

PE4 is a low density polyethylene with a density of 0.918 grams/cc.

PET1 is a chemically primed polyethylene terephthalate film.

SX1 is a siloxane masterbatch.

All compositional percentages given herein are by weight, unless indicated otherwise.

EXAMPLES

Several commercially available photoinitiators were studied as blends with $BBP^3$, the current PI from Chevron-Phillips. Isopropylthioxanthone (ITX) was found to be particularly effective in combination with $BBP^3$. Nearly doubling the cobalt level was found to positively influence the triggering speed, but the magnitude of the effect was less than adding ITX.

There is a need to trigger films at substantially greater speeds than are currently possible with the model 4100 Scavenging Initiation System (SIS) units. Current triggering units are limited to speeds of less than about 20 fpm for room temperature or below fill conditions. Model 4100 triggering units are based on low-pressure germicidal lamps that are limited to approximately 5–10 mW/cm² intensity at 254 nm. Reformulation of the catalyst and photoinitiator package in the Oxygen Scavenging Layer (OSL) has been demonstrated as one means to achieve higher speed triggering.

Alternative photoinitiators to Chevron's BBP[3] and blends with BBP[3] in VECTOR™ 8508 based oxygen scavenging systems were also explored. VECTOR™ 8508 is a styrene butadiene block copolymer from Dexco.

To determine the oxygen scavenging rate of the films, irradiated films of well-defined area (usually 200 cm$^2$) were vacuum packaged in barrier pouches (P 640B™, Cryovac division of Sealed Air Corp.) having an oxygen transmission rate (OTR) of 5 cc/m$^2$/day). The pouches were inflated with 300 cc of nitrogen atmosphere at about 1% residual oxygen. In an alternate method, irradiated film samples were used directly as lidstock, on a Multivac R230™ packaging machine, along with bottom web (T6070B™, Cryovac division of Sealed Air Corp.). Gas flushing with the same 1% residual oxygen was also utilized. Samples were then stored at 4–5° C. (refrigerated) for the duration of the test unless indicated otherwise. Portions of the headspace were periodically withdrawn and analyzed for oxygen with a Mocon PAC CHECK™ model 400 or 450 oxygen analyzer.

The average oxygen scavenging rate was calculated by considering only the end points, with the following formula: Average Rate=cc O$_2$ scavenged/(m$^2$·Δday), and in these examples was calculated 4 days after UV triggering. The peak (instantaneous) rate is the highest scavenging rate observed during any sampling period, and is given by: Δcc O$_2$ scavenged/(m$^2$·Δ day), where Δ is the incremental change between two consecutive measurements. Measurements are typically taken on the day of triggering and after 1, 4, 7, 14, and 21 days after triggering. Rates are further reported as the mean of at least three replicates. The number of days after triggering that the peak instantaneous rate occurs is often frequently noted as an indication of the triggering performance.

Screening Alternative Photoinitiators and Catalysts

Four layer blown films were made to study the effect of reformulating the photoinitiator (PI) and catalyst package on triggering speed. The sealant used in these structures was a high slip formulation intended for use in VFFS films that require high speed triggering. The general structure used is shown below.

| Film Structure 1. General Structure of Reformulated Films | | | | |
|---|---|---|---|---|
| 70% PE3 20% PE4 7% AB1 3% SX1 | OSL | EV1 | EV1 | |
| 0.25 | 0.75 | 0.50 | 0.50 | 2.0 mil |

The total gauge of Film Structure 1 was 2.0 mils, with the gauge thickness of each layer, in mils, as indicated above.

The OSL (oxygen scavenging layer) comprised 90% OS1 with various combinations of masterbatches to test catalysts and photoinitiators. Each photoinitiator was tested by making a masterbatch in EMCM and adding that to the standard formulation (10% OSM2). Some photoinitiators were screened in cobalt neodecanoate (CoND) masterbatches as well without using the standard masterbatch. The photoinitiators chosen for study were ITX, BMS, and IRGACURE™ 819. These films were first screened by triggering on a 4104V SIS unit. Film is typically run through this unit at 10 fpm, which provides a dose of about 760 mJ/cm$^2$. Higher speeds were chosen to determine the triggering thresholds for these various formulations. The results are shown below in Table 1.

It can be seen from the data in Table 1 that at a speed of 19 fpm (dose=400 mJ/cm$^2$), the control (sample 1) showed somewhat marginal performance as expected. At this speed, the peak instantaneous scavenging rates were adversely affected, although the average rate was still good. ITX as a replacement for BBP[3] (sample 3) showed similar behavior as the control. Irgacure 819 alone (sample 7) was not effective with the germicidal lamps. Similarly, no advantages were seen for CoND at 2000 ppm Co (sample 2) without a PI.

TABLE 1

Summary of Scavenging Rates for Reformulated Films Triggered with 4104 V, Refrigerated MAP Conditions

| Film Sample | Catalyst & PI[a] | Speed (fpm) | UV Dose (mJ/cm$^2$) | Induction Period (days) | Average Rate[b] (cc/m$^2$/d) | SD | Peak Ins. Rate (cc/m$^2$/d) | SD | Peak Day |
|---|---|---|---|---|---|---|---|---|---|
| Control Film 1 | CoOL & BBP3 | 19 | 400 | <1 | 24.9 | 1.3 | 27.3 | 1.8 | 2 |
| 2 | CoND (no PI) | 19 | 400 | >21 | 0 | — | 0 | — | — |
| 3 | CoND & ITX | 19 | 400 | <1 | 24.8 | 1.1 | 27.0 | 2.4 | 3 |
| 4 | CoOL & BBP3 & ITX | 19 | 400 | <1 | 27.1 | 2.0 | 57.7 | 4.5 | 1 |
| 5 | CoOL & BBP3 & BMS | 19 | 400 | <1 | 30.5 | 0.8 | 63.3 | 4.7 | 1 |
| 6 | CoOL & BBP3 & Irgacure 819 | 19 | 400 | <1 | 31.0 | 0.2 | 62.6 | 1.7 | 1 |
| 7 | CoND & Irgacure 819 | 19 | 400 | >21 | 0 | — | 0 | — | — |
| Control Film 1 | CoOL & BBP3 | 38 | 200 | >21 | 0 | — | 0 | — | — |
| 2 | CoND (no PI) | 38 | 200 | >21 | 0 | — | 0 | — | — |
| 3 | CoND & ITX | 38 | 200 | <1 | 19.9 | 0.1 | 22.4 | 1.9 | 4 |
| 4 | CoOL & BBP3 & ITX | 38 | 200 | <1 | 27.5 | 1.0 | 36.7 | 2.6 | 1 |
| 5 | CoOL & BBP3 & BMS | 38 | 200 | >1 < 7 | 0 | — | 14.9 | 0.6 | 12 |

TABLE 1-continued

Summary of Scavenging Rates for Reformulated Films
Triggered with 4104 V, Refrigerated MAP Conditions

| Film Sample | Catalyst & PI[a] | Speed (fpm) | UV Dose (mJ/cm$^2$) | Induction Period (days) | Average Rate[b] (cc/m$^2$/d) | SD | Peak Ins. Rate (cc/m$^2$/d) | SD | Peak Day |
|---|---|---|---|---|---|---|---|---|---|
| 6 | CoOL BBP3 & Irgacure 819 | 38 | 200 | >21 | 0 | — | 0 | — | — |
| 7 | CoND & Irgacure 819 | 38 | 200 | >21 | 0 | — | 0 | — | — |

[a]Samples 3 and 7 have 1000 ppm PI, all others (except #2) have 1000 ppm BBP$^3$ and 500 ppm of alternate PI. Sample 2 has 2000 ppm Co. Control is 90/10 OS1 and OSM2.
[b]Average rate at 4 days
[c]CoOL is cobalt oleate.

The combination of BBP$^3$ with ITX, BMS, and IRGACURE™ 819 all showed improvement relative to the control at 19 fpm. At 38 fpm (dose=200 mJ/cm$^2$), only samples with ITX remained active. The combination of BBP$^3$ and ITX looked the best. In a second test, selected films were run at 40 and 60 fpm as these were targeted packaging speeds. These results are shown below in Table 2.

TABLE 2

Summary of Scavenging Rates at 40 and 60 fpm
Triggered with 4104 V, Refrigerated MAP Conditions

| Film Sample | Catalyst[a] | Speed (fpm) | UV Dose (mJ/cm$^2$) | Induction Period (days) | Average Rate[b] (cc/m$^2$/d) | SD | Peak Ins. Rate (cc/m$^2$/d) | SD | Peak Day |
|---|---|---|---|---|---|---|---|---|---|
| 3 | CoND & ITX | 40 | 190 | >1 < 4 | 4.2 | 2.9 | 20.4 | 2.6 | 7 |
| 4 | CoOL & BBP3 & ITX | 40 | 190 | >1 < 4 | 16.3 | 3.3 | 23.4 | 4.4 | 4 |
| 3 | CoND & ITX | 60 | 127 | >14 < 21 | 0 | — | 11.7 | 2.7 | 21 |
| 4 | CoOL & BBP3 & ITX | 60 | 127 | >14 < 21 | 0 | — | 10.3 | 2.7 | 21 |

[a]Sample 3 has 1000 ppm PI, all others has 1000 ppm BBP$^3$ and 500 ppm of alternate PI.
[b]Average rate at 4 days
[c]CoOL is cobalt oleate.
[e]SD is standard deviation.

The data in Table 2 show that sample 4 with the combination of BBP$^3$ and ITX exhibited the best triggering. At 40 fpm, the scavenging rate was relatively low, but may be acceptable for some applications. Ambient scavenging rates would be higher (e.g., beef jerky applications) and the resulting rate may be acceptable. Neither sample showed activity until after 14 days at 60 fpm. When triggering with germicidal type lamps (principal emission at 254 nm), ITX in combination with BBP$^3$ showed significant enhancement. Based on previous results with the VECTOR™ 8508 material, it was not expected to see this level of improvement from simply adding more BBP$^3$ to the formulation. The samples of film structure 1 were triggered with a xenon flash lamp from Xenon Corp., Woburn Mass. Xenon lamps have an emission from 200 to 1000 nm. The lamp was a 4.2" spiral type C lamp operating at 10 Hz and samples were irradiated at 0.5 inch distance from the lamp housing. Samples were exposed for 3 seconds, which was previously determined to be a marginal dose for the control formulation. Oxygen scavenging activity was tested as described above.

TABLE 3

Summary of Scavenging Rates for Reformulated Films
Refrigerated MAP Conditions, 4.2" Xenon lamp, 3 sec. at 0.5"

| Sample | PI[a] | Catalyst[b] | Induction Period (days) | Average Rate[c] (cc/m$^2$/d) | SD | Ins. Rate (cc/m$^2$/d) | SD | Peak Day (days) |
|---|---|---|---|---|---|---|---|---|
| Sample 1 | 1000 ppm BBP$^3$ | 1000 ppm CoOL | >1 < 7 | 2.8 | 4.9 | 8.1 | 3.8 | 12 |
| Sample 2 | No PI | 2000 ppm CoND | <1 | 9.8 | 4.1 | 13.2 | 1.9 | 6 |
| Sample 3 | 1000 ppm ITX | 1000 ppm CoND | >21 | 0.0 | 0.0 | 0.0 | 0.0 | — |

TABLE 3-continued

Summary of Scavenging Rates for Reformulated Films
Refrigerated MAP Conditions, 4.2" Xenon lamp, 3 sec. at 0.5"

| Sample | PI[a] | Catalyst[b] | Induction Period (days) | Average Rate[c] (cc/m²/d) | SD | Ins. Rate (cc/m²/d) | SD | Peak Day (days) |
|---|---|---|---|---|---|---|---|---|
| Sample 4 | 1000 ppm BBP³, 500 ppm ITX | 1000 ppm CoOL | >1 < 4 | 8.6 | 3.5 | 13.8 | 1.6 | 5 |
| Sample 5 | 1000 ppm BBP³, 500 ppm BMS | 1000 ppm CoOL | <1 | 20.0 | 1.1 | 21.7 | 1.8 | 4 |
| Sample 6 | 1000 ppm BBP³, 500 ppm Irg. 819 | 1000 ppm CoOL | <1 | 22.8 | 3.9 | 28.1 | 7.3 | 2 |
| Sample 7 | 1000 ppm Irg. 819 | 1000 ppm CoND | >1 < 4 | 3.5 | 1.5 | 8.7 | 3.8 | 6 |

[a]ITX = 2-isopropylthioxanthone, BMS = 4,4'-benzoyl methyl diphenyl sulfide, Irg. 819 = Irgacure 819 from Ciba.
[b]CoOL = cobalt oleate, CoND = cobalt neodecanoate
[c]Average Rate at 4 days Cobalt neodecanoate and ITX were not particularly effective with the xenon lamp (sample 3). Adding ITX to the standard formulation gave only a slight improvement (sample 4). On the other hand, adding BMS and Irgacure 819 to the standard formulation resulted in a substantial improvement in the triggering performance, with Irgacure 819 looking slightly better. Irgacure 819 by itself (in CoND) was not particularly effective.

The samples of film structure 1 were triggering with a Fusion lamp from Fusion Systems, Gaithersburg Md. The 10 inch Fusion lamp equipped with a dichroic reflector was mounted on a conveyor to expose the film samples in the lamp focus. The lamp type used was an H+, which has principal emissions similar to a typical medium pressure mercury arc lamp. Samples were passed under the lamp twice at 20 fpm, which was previously determined to be a marginal UV dose for the control formulation. Oxygen scavenging testing was conducted as described above.

ment relative to the control with Irgacure 819 showing particularly improved performance.

Additional four layer blown films were made for further evaluation. The structure was the same as used previously (Film Structure 1) with a small amount of antiblock added to the bulk layer to facilitate opening the tube. The general structure used is shown below.

Film Structure 2.
General Structure of Reformulated Films

| 70% PE3 20% PE4 7% AB1 3% SX1 | OSL | 95% EV1 5% AB1 | 95% EV1 5% AB1 | |
|---|---|---|---|---|
| 0.25 | 0.75 | 0.50 | 0.50 | 2.0 mil |

TABLE 4

Comparison of Film Formulations using Fusion H+ Lamp in Standard Position
In focus, dichroic reflector, 600 W/in., Lesco Conveyor, two passes at 20 fpm

| Sample | PI[a] | Catalyst[b] | Induction Period (days) | Average Rate[c] (cc/m²/d) | SD | Ins. Rate (cc/m²/d) | SD | Peak Day (days) |
|---|---|---|---|---|---|---|---|---|
| Control | 1000 ppm BBP³ | 1000 ppm CoOL | >1 < 4 | 11.9 | 5.6 | 19.7 | 3.8 | 6 |
| Sample 2 | none | 2000 ppm CoND | >1 < 4 | 15.0 | 11.5 | 21.5 | 7.0 | 5 |
| Sample 3 | 1000 ppm ITX | 1000 ppm CoND | >21 | −0.4 | 0.4 | 0.3 | 0.3 | — |
| Sample 4 | 1000 ppm BBP³, 500 ppm ITX | 1000 ppm CoOL | <1 | 19.2 | 8.9 | 24.3 | 1.8 | 3 |
| Sample 5 | 1000 ppm BBP³, 500 ppm BMS | 1000 ppm CoOL | >1 < 4 | 17.4 | 5.1 | 21.3 | 4.4 | 4 |
| Sample 6 | 1000 ppm BBP³, 500 ppm Irg. 819 | 1000 ppm CoOL | <1 | 23.2 | 4.6 | 30.8 | 0.9 | 1 |
| Sample 7 | 1000 ppm Irg. 819 | 1000 ppm CoND | >21 | −0.1 | 1.0 | 1.9 | 3.3 | — |

[a]ITX = 2-isopropylthioxanthone, BMS = 4,4'-benzoyl methyl diphenyl sulfide, Irg. 819 = Irgacure 819 from Ciba.
[b]CoOL = cobalt oleate, CoND = cobalt neodecanoate
[c]Average rate at 4 days
[d]Ins. Rate = instantaneous rate.

The data in Table 4 show that two passes at 20 fpm with the Fusion lamp results in marginal scavenging performance from the control sample 1. Samples 3–6 all show improve- The OSL included 90% OS1 with 10% masterbatch to test various photoinitiator blends. Unlike the previous study where the photoinitiators were tested by making a masterbatch in EMCM and adding that to the standard formulation (10% OSM2, cobalt oleate/BBP[3] masterbatch), all masterbatches were formulated from scratch. In order to aid feeding the powders, some ethylene/methyl acrylate copolymer (Voridian SP2260) was ground and mixed with the powdered PI and CoOL prill.

TABLE 5

Summary of Scavenging Rates for Reformulated Films Triggered with 4104 V, Refrigerated MAP Conditions

| Film Sample | PI[a] (ppm) | Speed (fpm) | UV Dose (mJ/cm$^2$) | Induction Period (days) | Average Rate[b] (cc/m$^2$/d) | SD | Peak Ins. Rate (cc/m$^2$/d) | SD | Peak Day |
|---|---|---|---|---|---|---|---|---|---|
| Control Film 10 | BBP3 (1000) | 20 | 355 | <1 | 28.0 | 0.3 | 48.2 | 1.3 | 1 |
| 11 | BBP3/ITX (1000/500) | 20 | 355 | <1 | 28.8 | 0.6 | 54.9 | 4.3 | 1 |
| 12 | BBP3/ITX (1000/1000) | 20 | 355 | <1 | 29.7 | 0.6 | 55.0 | 1.9 | 1 |
| 13 | BBP3/Irgacure 819 (1000/500) | 20 | 355 | <1 | 24.3 | 1.6 | 31.1 | 0.6 | 4 |
| 14 | BBP3/Irgacure 819 (1000/1000) | 20 | 355 | <1 | 28.5 | 1.2 | 29.4 | 0.3 | 2 |
| 15 | ITX/Irgacure 819 (1000/500) | 20 | 355 | <1 | 23.9 | 5.4 | 50.0 | 2.1 | 1 |
| Control Film 10 | BBP3 (1000) | 40 | 178 | >21 | 0 | — | 0 | — | — |
| 11 | BBP3/ITX (1000/500) | 40 | 178 | >1 < 4 | 13.6 | 5.9 | 23.2 | 3.5 | 5 |
| 12 | BBP3/ITX (1000/1000) | 40 | 178 | <1 | 25.5 | 0.8 | 32.1 | 2.1 | 4 |
| 13 | BBP3/Irgacure 819 (1000/500) | 40 | 178 | >21 | 0 | — | 0 | — | — |
| 14 | BBP3/Irgacure 819 (1000/1000) | 40 | 178 | >21 | 0 | — | 0 | — | — |
| 15 | ITX/Irgacure 819 (1000/500) | 40 | 178 | <1 | 27.6 | 0.9 | 31.5 | 4.4 | 3 |

[a]All samples with CoOL. Control Film 10 is 10% OSM1.
[b]Average rate at 4 days These films were first screened by triggering on a Model 4104V SIS triggering unit at the standard 10 fpm, which provides a dose of about 710 mJ/cm$^2$. At 10 fpm, all films scavenged very well under refrigerated MAP conditions with average rates from 28.5–31.0 cc/m$^2$/d and peak instantaneous rates from 43.6–64.9 cc/m$^2$/d. Higher speeds were then run to determine triggering thresholds. These results are shown above in Table 5.

All of the films showed good to very good scavenging performance at 20 fpm (Table 5). Formulations that contained ITX (samples 11 & 12), showed higher peak instantaneous rates than the control at 20 fpm. Formulations containing IRGACURE™ 819 (13 and 14) did not show any particular improvement with the germicidal lamps. An exception is sample 15, which used ITX and IRGACURE™ 819 in place of BBP[3]. It is known that ITX can be an effective sensitizer for phosphine oxide type PI's such as IRGACURE™ 819, and the results herein support that conclusion.

At 40 fpm (Table 5), the control was inactive through 21 days of testing, as were samples 13 & 14 with the BBP[3]/Irgacure 819 combination. Samples 11, 12 and 15 were active with 12 and 15 having reasonable refrigerated scavenging rates. Either formulation 12 or 15 would be suited for applications running at 40 fpm under refrigerated or ambient conditions. To further evaluate these films, samples 11, 12, & 15 were run at 60 fpm (dose=118 mJ/cm$^2$) and tested at refrigerated and ambient conditions. These results are shown below in Table 6.

The data in Table 6 show that none of the samples had acceptable headspace scavenging performance at 60 fpm under refrigerated test conditions. Under ambient storage conditions, sample 15 had modest scavenging activity.

TABLE 6

Summary of Scavenging Rates at 60 fpm
Triggered with 4104 V, Refrigerated and Ambient MAP Conditions

| Film Sample | PI[a] | Test Temp. (° C.) | UV Dose (mJ/cm$^2$) | Induction Period (days) | Average Rate[b] (cc/m$^2$/d) | SD | Peak Ins. Rate (cc/m$^2$/d) | SD | Peak Day |
|---|---|---|---|---|---|---|---|---|---|
| 11 | BBP3/ITX (1000/500) | 5 | 118 | >21 | 0 | — | 0 | — | — |
| 12 | BBP3/ITX (1000/1000) | 5 | 118 | >7 < 14 | 0 | — | 5.9 | 3.8 | 21 |
| 15 | ITX/Irgacure 819 (1000/500) | 5 | 118 | >1 < 4 | 0.5 | 0.8 | 12.7 | 2.4 | 7 |
| 11 | BBP3/ITX (1000/500) | 22 | 118 | >1 < 4 | 5.3 | 4.2 | 28.2 | 3.5 | 7 |
| 12 | BBP3/ITX (1000/1000) | 22 | 118 | >7 < 14 | 0 | — | 10.5 | 2.0 | 14 |
| 15 | ITX/Irgacure 819 (1000/500) | 22 | 118 | >1 < 4 | 22.6 | 2.2 | 31.4 | 2.5 | 4 |

[a]All samples with CoOL
[b]Average rate at 4 days

Migration Tests

Samples 1, 4, 5, and 6 (Film Structure 1 and Table 1) containing alternative PI blends and BBP[3] controls were submitted for migration analysis. The samples were triggered at a dosage of 710 mJ/cm$^2$ and extracted for 10 days at 40° C. by complete immersion in 95% ethanol as a food simulant, without waiting for the samples to oxidize. In previous experiments, it was shown that waiting for samples to oxidize had little effect on PI migration.

The migration of ITX and IRGACURE™ 819 was less than 50 ppb, and the migration of BMS was about 50 ppb.

In this test, the migration of BBP[3] from the control was about 200 ppb as expected. Surprisingly, the migration of BBP[3] from the samples containing the alternate PI was lower than in the control. The levels of BBP[3] were about 3 to 4 times lower and hence near 50 ppb.

Samples 9, 11, 12, and 15 (Film Structure 2 and Table 3) were also submitted for migration analysis. These samples were triggered and extracted as described above. The control and film sample 11 with 500 ppm ITX reproduced well. Film sample 12 which had 1000 ppm of ITX added also showed less than 50 ppb migration of ITX. Both samples 11 and 12 again showed significantly lower migration of BBP[3] than the control. Sample 15 which had ITX and IRGACURE™ 819 with no BBP[3] showed less than 50 ppb of ITX and IRGACURE™ 819.

Based on these results, two commercial laminate structures were made containing ITX added to the standard catalyst package. The ITX was added via a masterbatch OSM4. This material was compounded on a WP-30 twin-screw extruder.

These structures are shown below as Film Structures 3 and 4. Control Film 1 (LDX 7812) served as a control for these extractions as it is the same structure without ITX in the oxygen scavenging layer.

| Film Structure 3. | | | | | | | | | |
|---|---|---|---|---|---|---|---|---|---|
| 88% PE2 8% AB1 4% SX1 | 85% OS1 10% OSM1 5% OSM4 | AD1 | 80% NY1 20% NY2 | OB1 | 80% NY1 20% NY2 | AD1 | PE1 | PE1 | PET1 |
| 0.25 | 0.75 | 0.18 | 0.18 | 0.25 | 0.19 | 0.20 | 0.25 | 0.25 | 0.48 |

| Film Structure 4. | | | | | | | | | |
|---|---|---|---|---|---|---|---|---|---|
| 88% PE2 8% AB1 4% SX1 | 80% OS1 10% OSM1 10% OSM4 | AD1 | 80% NY1 20% NY2 | OB1 | 80% NY1 20% NY2 | AD1 | PE1 | PE1 | PET1 |
| 0.25 | 0.75 | 0.18 | 0.18 | 0.25 | 0.19 | 0.20 | 0.25 | 0.25 | 0.48 |

To verify the enhanced triggering effect, these films were triggered on a model 4104V SIS unit at 10, 15, and 20 fpm. The scavenging rates for these films are shown below in Table 7.

At 10 fpm all of the samples scavenged well with perhaps only a slight advantage in the peak instantaneous rate for the samples with ITX. At 15 fpm and particularly at 20 fpm the differences were notable. At 20 fpm both Film Structure 3 and Film Structure 4, each having ITX, maintained equivalent scavenging performance to the Control Film 1 at 10 fpm. These samples may be practical for applications running at 30 or 40 fpm, especially if the applications are at ambient temperatures (e.g., beef jerky).

TABLE 7

Refrigerated MAP Scavenging Rates for Films with ITX

| Structure (LDX) | Speed (fpm) | Induction Period (days) | Average Rate (cc O$_2$/m$^2$/d) | SD | Ins. Rate (cc O$_2$/m$^2$/d) | SD | Peak Day |
| --- | --- | --- | --- | --- | --- | --- | --- |
| CF1[a] | 10 | <1 | 33.8 | 1.2 | 62.1 | 11.9 | 1 |
| FS3[b] | 10 | <1 | 34.7 | 0.2 | 70.4 | 1.4 | 1 |
| FS4[c] | 10 | <1 | 28.1 | 3.4 | 65.4 | 3.3 | 1 |
| CF1 | 15 | <1 | 31.7 | 1.7 | 49.5 | 4.0 | 1 |
| FS3 | 15 | <1 | 34.5 | 0.7 | 76.3 | 2.6 | 1 |
| FS4 | 15 | <1 | 34.7 | 0.5 | 76.6 | 3.4 | 1 |
| CF1 | 20 | >1 < 4 | 18.4 | 5.4 | 28.7 | 4.0 | 4 |
| FS3 | 20 | <1 | 33.9 | 1.0 | 69.7 | 4.9 | 1 |
| FS4 | 20 | <1 | 34.2 | 0.8 | 71.2 | 4.0 | 1 |

[a]CF1 = control film 1.
[b]FS3 = film structure 3.
[c]FS4 = film structure 4.

Control Film 1, Film Structure 3 and Film Structure 4 were submitted for regulatory compliance testing. The samples were triggered at a dosage of 710 mJ/cm$^2$ and extracted for 10 days at 40° C. with olive oil. The results are summarized below in Table 8.

TABLE 8

Migration Data for BBP$^3$ and ITX in Olive Oil
10 days at 40° C., Expressed as ppb in food assuming 10 g/in$^2$

| Sample | BBP$^3$ (ppb) | ITX[a] (ppb) |
| --- | --- | --- |
| CF1 | 470 | — |
| FS3 | 120 | 35 |
| FS4 | 160 | 70 |

[a]Detection limit at 50 ppb, levels less than about 150 ppb may not be reliably quantitative.

The data in Table 8 show that the ITX migration from Film Structure 3 was less than 50 ppb while that from Film Structure 4 was just over 50 ppb.

Some conclusions reached from the tests:

For triggering with a germicidal source, the addition of isopropylthioxanthone (ITX) to the standard catalyst/PI package provided substantial improvement.

The BBP$^3$/ITX PI combination showed modest scavenging rates at 40 fpm (dose=178 mJ/cm$^2$) under refrigerated conditions, providing an indication that this combination may be acceptable for ambient applications.

Some room temperature scavenging at 60 fpm was seen from the ITX/IRGACURE™ 819 combination, which would be acceptable for some applications.

Migration results for ITX and IRGACURE™ 819 were excellent. ITX and IRGACURE™ 819 were not detected at 50 ppb in samples extracted with 95% ethanol at 40° C.

Migration of ITX into olive oil was less than 50 ppb when used at 500 ppm, and just over 50 ppb when used at 1000 ppm (UV dose=710 mJ/cm$^2$) in commercial film structures. The migration of BBP$^3$ is significantly less when ITX or Irgacure 819 are added to the formulation, which can facilitate regulatory compliance.

The combination of ITX and IRGACURE™ 819 could potentially replace BBP$^3$.

The invention is not limited to the illustrations described herein, which are deemed to be merely illustrative, and susceptible of modification of form, size, arrangement of parts and details of operation.

What is claimed is:

1. An oxygen scavenger composition comprising:
   a) an organic oxygen scavenger comprising poly (ethylene/methyl acrylate/cyclohexene methyl acrylate),
   b) a transition metal catalyst comprising an organic cobalt salt, and
   c) a blend of
      i) 1,3,5-tris(4-benzoylphenyl) benzene, and
      ii) a photoinitiator comprising one or more materials selected from the group consisting of
         (a) isopropylthioxanthone,
         (b) 2,4-diethylthioxanthone,
         (c) 2-chlorothioxanthone, and
         (d) 1-chloro-4-propoxythioxanthone.

2. The composition of claim 1 wherein the blend of photoinitiators comprises between 500 and 2000 ppm by weight of the oxygen scavenger composition.

3. The composition of claim 1 wherein the blend comprises a blend of 1,3,5-tris(4-benzoylphenyl)benzene and isopropylthioxanthone.

4. The oxygen scavenger composition of claim 1 wherein the organic cobalt salt comprises a material selected from the group consisting of cobalt oleate and cobalt neodecanoate.

5. A method of triggering an oxygen scavenger composition comprising:
   a) providing an oxygen scavenger composition comprising
      i) an organic oxygen scavenger comprising poly (ethylene/methyl acrylate/cyclohexene methyl acrylate),
      ii) a transition metal catalyst comprising an organic cobalt salt, and
      iii) a blend of
         (a) 1,3,5-tris(4-benzoylphenyl)benzene, and
         (b) a photoinitiator comprising one or more materials selected from the group consisting of
            i) isopropylthioxanthone,
            ii) 2,4-diethylthioxanthone,
            iii) 2-chlorothioxanthone, and
            iv) 1-chloro-4-propoxythioxanthone; and
   b) subjecting the oxygen scavenger composition to a dosage of actinic radiation having a principal emission wavelength of 254 nanometers using a germicidal lamp to trigger the oxygen scavenger composition.

6. The method of claim 5 wherein the oxygen scavenger composition is exposed to a source of actinic radiation at an intensity at 254 nm of between 1.0 and 30 mW/cm$^2$.

7. The method of claim 5 wherein the oxygen scavenger composition is exposed to a source of actinic radiation at an intensity and residence time sufficient to provide said composition with a dose of actinic radiation of between 300 mJ/cm$^2$ and 1600 mJ/cm$^2$.

8. The method of claim 5 wherein the organic cobalt salt comprises a material selected from the group consisting of cobalt oleate and cobalt neodecanoate.

9. An oxygen scavenger composition comprising:
   a) an organic oxygen scavenger comprising poly (ethylene/methyl acrylate/cyclohexene methyl acrylate),
   b) a transition metal catalyst comprising an organic cobalt salt, and
   c) a blend of
      i) 1,3,5-tris(4-benzoylphenyl) benzene, and
      ii) 4,4'-benzoylmethyl diphenyl sulfide.

10. The composition of claim 9 wherein the blend comprises between 500 and 2000 ppm by weight of the oxygen scavenger composition.

11. The oxygen scavenger composition of claim 9 wherein the organic cobalt salt comprises a material selected from the group consisting of cobalt oleate and cobalt neodecanoate.

12. A method of triggering an oxygen scavenger composition comprises:
   a) providing an oxygen scavenger composition comprising
      i) an organic oxygen scavenger comprising poly (ethylene/methyl acrylate/cyclohexene methyl acrylate),
      ii) a transition metal catalyst comprising an organic cobalt salt, and
      iii) a blend of
         (a) 1,3,5-tris(4-benzoylphenyl)benzene, and
         (b) 4,4'-benzoylmethyl diphenyl sulfide; and
   b) subjecting the oxygen scavenger composition to a dosage of actinic radiation effective to trigger the oxygen scavenger composition.

13. The method of claim 12 wherein the oxygen scavenger composition is exposed to a source of actinic radiation at an intensity at 254 nm of between 1.0 and 30 mW/cm$^2$.

14. The method of claim 12 wherein the oxygen scavenger composition is exposed to a source of actinic radiation at an intensity and residence time sufficient to provide said composition with a dose of actinic radiation of between 300 mJ/cm$^2$ and 1600 mJ/cm$^2$.

15. The method of claim 12 wherein the organic cobalt salt comprises a material selected from the group consisting of cobalt oleate and cobalt neodecanoate.

16. An oxygen scavenger composition comprising:
   a) an organic oxygen scavenger comprising poly (ethylene/methyl acrylate/cyclohexene methyl acrylate),
   b) a transition metal catalyst comprising an organic cobalt salt, and
   c) a blend of
      i) 1,3,5-tris(4-benzoylphenyl) benzene, and
      ii) a photoinitiator comprising one or more materials selected from the group consisting of
         (a) bis(2,4,6-trimethylbenzoyl)phenylphosphine oxide,
         (b) 2,4,6-trimethylbenzoyldiphenylphosphine oxide,
         (c) ethyl-2,4,6-trimethylbenzoylphenyl phosphinate, and
         (d) bis(2,6-dimethoxybenzoyl)-2,4,4-trimethylpentyl phosphine oxide.

17. The composition of claim 16 wherein the blend comprises between 500 and 2000 ppm by weight of the oxygen scavenger composition.

18. The composition of claim 16 wherein the blend comprises a blend of 1,3,5-tris(4-benzoylphenyl)benzene and bis(2,4,6- trimethylbenzoyl) phenylphosphine oxide.

19. The oxygen scavenger composition of claim 16 wherein the organic cobalt salt comprises a material selected from the group consisting of cobalt oleate and cobalt neodecanoate.

20. A method of triggering an oxygen scavenger composition comprising:
   a) providing an oxygen scavenger composition comprising
      i) an organic oxygen scavenger comprising poly (ethylene/methyl acrylate/cyclohexene methyl acrylate),
      ii) a transition metal catalyst comprising an organic cobalt salt, and
      iii) a blend of
         (a) 1,3,5-tris(4-benzoylphenyl)benzene, and
         (b) a photoinitiator comprising one or more materials selected from the group consisting of
            i) bis(2,4,6-trimethylbenzoyl)phenylphosphine oxide,
            ii) 2,4,6-trimethylbenzoyldiphenylphosphine oxide,
            iii) ethyl-2,4,6-trimethylbenzoylphenyl phosphinate, and
            iv) bis(2,6-dimethoxybenzoyl)-2,4,4-trimethylpentyl phosphine oxide; and
   b) subjecting the oxygen scavenger composition to a dosage of actinic radiation using a polychromatic UV source to trigger the oxygen scavenger composition.

21. The method of claim 20 wherein the oxygen scavenger composition is exposed to a source of actinic radiation at an intensity at 254 nm of between 1.0 and 30 mW/cm$^2$.

22. The method of claim 20 wherein the oxygen scavenger composition is exposed to a source of actinic radiation at an intensity and residence time sufficient to provide said composition with a dose of actinic radiation of between 300 mJ/cm$^2$ and 1600 mJ/cm$^2$.

23. The method of claim 20 wherein the organic cobalt salt comprises a material selected from the group consisting of cobalt oleate and cobalt neodecanoate.

24. The method of claim 20 wherein the polychromatic UV source is selected from a medium pressure mercury arc lamp or a xenon flash lamp.

25. An oxygen scavenger composition comprising:
   a) an organic oxygen scavenger comprising poly (ethylene/methyl acrylate/cyclohexene methyl acrylate),
   b) a transition metal catalyst comprising an organic cobalt salt, and
   c) a blend of
      i) a first photoinitiator comprising one or more materials selected from the group consisting of
         (a) isopropylthioxanthone,
         (b) 2,4-diethylthioxanthone,
         (c) 2-chlorothioxanthone, and
         (d) 1-chloro-4-propoxythioxanthone; and
      ii) a second photoinitiator comprising one or more materials selected from the group consisting of
         (a) bis(2,4,6-trimethylbenzoyl)phenylphosphine oxide,
         (b) 2,4,6-trimethylbenzoyldiphenylphosphine oxide,
         (c) ethyl-2,4,6-trimethylbenzoylphenyl phosphinate, and
         (d) bis(2,6-dimethoxybenzoyl)-2,4,4-trimethyipentyl phosphine oxide.

26. The composition of claim 25 wherein the blend comprises between 500 and 2000 ppm by weight of the oxygen scavenger composition.

27. The composition of claim 25 wherein the blend comprises a blend of isopropylthioxanthone and bis(2,4,6-trimethylbenzoyl) phenylphosphine oxide.

28. The oxygen scavenger composition of claim 25 wherein the organic cobalt salt comprises a material selected from the group consisting of cobalt oleate and cobalt neodecanoate.

29. A method of triggering an oxygen scavenger composition comprising:
 a) providing an oxygen scavenger composition comprising
  i) an organic oxygen scavenger comprising poly(ethylene/methyl acrylate/cyclohexene methyl acrylate),
  ii) a transition metal catalyst comprising an organic cobalt salt, and
  iii) a blend of
   (a) a first photoinitiator comprising one or more materials selected from the group consisting of
    (i) isopropylthioxanthone
    (ii) 2,4-diethylthioxanthone,
    (iii) 2-chlorothioxanthone, and
    (iv) 1-chloro-4-propoxythioxanthone; and
   (b) a second photoinitiator comprising one or more materials selected from the group consisting of
    (i) bis(2,4,6-trimethylbenzoyl)phenylphosphine oxide,
    ii) 2,4,6-trimethylbenzoyldiphenylphosphine oxide,
    iii) ethyl-2,4,6-trimethylbenzoylphenyl phosphinate, and
    iv) bis(2,6-dimethoxybenzoyl)-2,4,4-trimethylpentyl phosphine oxide; and
 b) subjecting the oxygen scavenger composition to a dosage of actinic radiation having a principal emission wavelength of 254 nanometers using a germicidal lamp to trigger the oxygen scavenger composition.

30. The method of claim 29 wherein the oxygen scavenger composition is exposed to a source of actinic radiation at an intensity at 254 nm of between 1.0 and 30 mW/cm$^2$.

31. The method of claim 29 wherein the oxygen scavenger composition is exposed to a source of actinic radiation at an intensity and residence time sufficient to provide said composition with a dose of actinic radiation of between 300 mJ/cm$^2$ and 1600 mJ/cm$^2$.

32. The method of claim 29 wherein the organic cobalt salt comprises a material selected from the group consisting of cobalt oleate and cobalt neodecanoate.

* * * * *